Aug. 3, 1954
E. DE NADOR ET AL
2,685,184
UNIVERSAL JOINT AND SEAL
Filed July 2, 1952
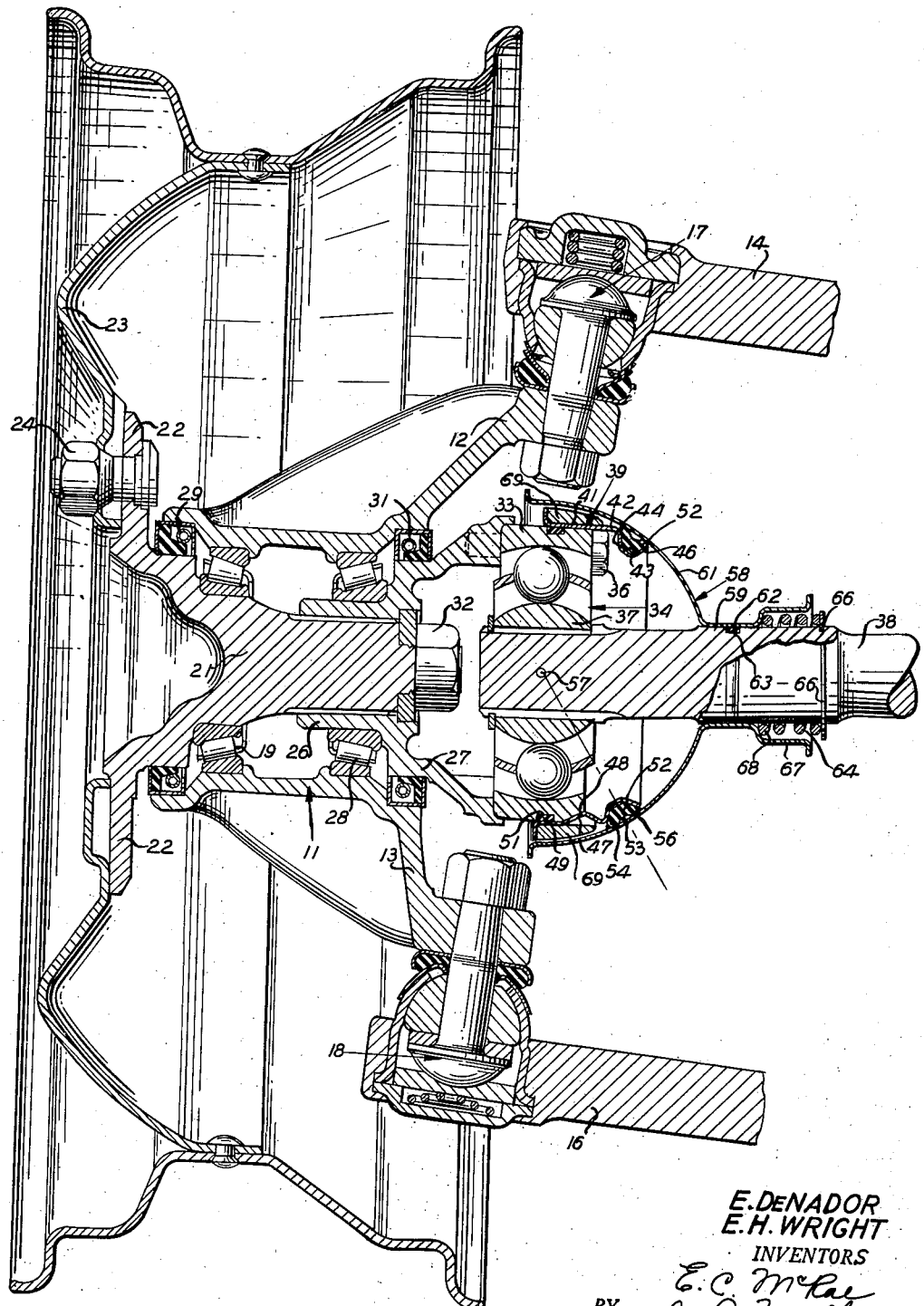
E. DE NADOR
E. H. WRIGHT
INVENTORS
BY E. C. McRae
J. R. Faulkner
D. H. Oster
ATTORNEYS

Patented Aug. 3, 1954

2,685,184

UNITED STATES PATENT OFFICE 2,685,184

UNIVERSAL JOINT AND SEAL

Emory De Nador and Evan H. Wright, Birmingham, Mich., assignors to Ford Motor Company, Dearborn, Mich., a corporation of Delaware Application July 2, 1952, Serial No. 296,918

2 Claims. (Cl. 64—32)

This invention relates generally to universal joints for motor vehicles and has particular reference a universal joint incorporating an effective seal.

An object of this invention is to provide a universal joint incorporating an effective seal which is of relatively inexpensive and lightweight construction and easy to install and remove. In addition, the seal must be effective throughout the required range of angularity between the driving and driven members.

A further object of the invention is to provide a universal joint incorporating a seal construction in which the rubber parts thereof are well protected and in which the effectiveness of the seal is not materially affected by water, dirt and extreme temperatures, and which therefore forms an effective and efficient seal for motor vehicles operating under normal conditions and also for commercial and military vehicles operating under more rigorous conditions.

Other objects and advantages of the invention will be made more apparent as this discription proceeds, particularly when considered in connection with the accompanying drawings, wherein:

The single figure is a transverse vertical cross-sectional view through a portion of a motor vehicle incorporating the universal joint of the present invention.

The drawing illustrates the invention as applied to a universal joint of the constant velocity type which forms a driving connection between an axle shaft and a front road wheel of a motor vehicle, such as a commercial or military vehicle in which the front wheels are power driven. It will be understood, of course, that the joint construction is equally applicable to universal joints in other locations in the power train of motor vehicles.

Referring now to the drawing, the reference character 11 indicates a non-rotating cast wheel hub having integral upwardly and downwardly extending arms 12 and 13 respectively. The arms 12 and 13 of the wheel hub are universally connected to upper and lower suspension arms 14 and 16 respectively by means of conventional ball joint assemblies 17 and 18 respectively. The suspension arms 14 and 16 are conventional and are pivotally connected at their ends to the frame of the motor vehicle.

The wheel hub 11 supports at its outward end a tapered roller bearing assembly 19, the outer race of which is pressed into the hub. The inner race of the bearing 19 is pressed on the wheel spindle 21, the latter being formed at its outboard end with an integral flange 22 to which the vehicle wheel 23 is secured by means of mounting bolts 24.

The inboard end of the wheel spindle 21 is splined and has mounted thereon the hub portion 26 of the annular universal joint flange 27. A second roller bearing assembly 28 is located between the wheel hub 11 and the hub portion 26 of the universal joint flange. An annular seal 29 is provided between the spindle 21 and the wheel hub 11 and a second annular seal 31 is provided between the universal joint flange 27 and the wheel hub 11. A nut 32 retains the universal joint flange 27 on the spindle 21.

The outer race 33 of a universal joint assembly 34 of the constant velocity type is mounted upon the inboard end of the universal joint flange 27 by means of studs 36. The universal joint assembly is conventional in construction and includes an inner race 37 mounted upon the outboard end of the axle driving shaft 38. The joint accommodates relative angularity between the axis of the driving axle and the axis of the wheel spindle 21.

The outer periphery of the outer race 33 of the universal joint is cylindrical and is embraced by a cylindrical shell 39. The shell 39 is a stamping having a body portion 41 embracing the outer peripheral surface of the universal joint outer race 33 and a projecting portion 42 extending inwardly beyond the inner end of the outer race 33. The projecting portion 42 is formed with an outwardly facing annular groove 43 having diverging side walls 44 and 46.

At several circumferentially spaced points around the periphery of the body portion 41 of the cylindrical shell 39 are a plurality of detents 47 engageable with corresponding indentations 48 formed in the outer race 33 of the universal joint. The interlocking engagements between the detents 47 and the indentations 48 prevent relative rotation between the outer race 33 and the cylindrical shell 39 and compel rotation of the cylindrical shell as a unit with the outer race of the joint. To prevent any leakage or infiltration between the universal joint outer race and the cylindrical shell, an annular sealing ring 49 of resilient material is provided, being seated in a groove 51 formed in the outer periphery of the outer race 33 and engaging the inner surface of the cylindrical shell 39.

The annular groove 43 formed in the projecting portion 42 of the cylindrical shell 39 carries an annular resilient sealing ring 52 corresponding generally in cross-section to the cross-section of the groove but projecting outwardly a distance beyond the outer extremity of the side walls 44 and 46 of the groove. The outer surface of the resilient sealing ring 52 is formed with a shallow annular groove 53 so as to provide spaced annular ribs 54 and 56 on the sealing ring. It will be noted that the groove 43 is inclined with respect to the body portion 41 of the cylindrical shell 39, with the inclination being such that the center line of the groove passes substantially through the center 57 of the universal joint. With this arrangement, the peripheral surfaces of the ribs 54 and 56 of the resilient sealing strip lie substantially along a sphere the center of which coincides with the center 57 of the universal joint.

The reference character 58 indicates generally a stamped shield having a hub portion 59 and a semispherical body portion 61 formed integrally therewith. The hub portion 59 embraces a machined outer surface of the axle shaft 38 for axial sliding movement relative thereto. The joint between the hub portion 59 of the shield and the axle shaft is sealed by means of an annular resilient sealing strip 62 seated in a groove 63 formed in the axle shaft and engaging the inner surface of the hub portion 59.

The semispherical body portion 61 of the shield 58 surrounds a portion of the universal joint assembly including the cylindrical shell 39. It is arranged in its normal position so that the center of the semispherical body portion 61 of the shield coincides with the center 57 of the universal joint, and in this position the inner surface of the shield engages the outer periphery of the resilient sealing strip 52 to form a seal therebetween. Inasmuch as both the shield 58 and the sealing strip 52 have a common center 57 it will be seen that an effective seal results. Furthermore, since the center 57 coincides with the center of the universal joint, it follows that this seal is effective as the angular relationship between the axle shaft 38 and the spindle 21 changes.

In order to maintain a leak proof seal between the sealing strip 52 and the semispherical portion 61 of the shield 58, the shield is spring urged toward the seal. A coil spring 64 surrounds the axle shaft 38 with its inboard end being held by a retaining ring 66 seated in a groove in the shaft. The hub portion 59 of the shield 58 is formed with a radially outwardly offset portion 67 to provide a shoulder 68 engaged by the opposite end of the coil spring 64. The hub also forms a shield protecting the spring from dirt and the like.

The coil spring 64 is assembled under a predetermined compressive load so as to exert a constant axial force upon the hub 59 of the shield 58 so that the semispherical portion 61 of the shield will be yieldably urged into sealing engagement with the sealing ring 52. The engagement of the semispherical portion of the shield with the two spaced ribs 54 and 56 of the sealing ring provides a double seal. Clearance is provided beyond the outboard end of the semispherical portion 61 of the shield to accommodate angular movement between the axle shaft and the wheel spindle, and an effective seal is maintained throughout the entire range of this relative angular movement. The seal 52, being spaced axially inwardly beyond the inner end of the universal joint enables the overall diameter of the shield to be held to a minimum while at the same time permitting the necessary angularity.

A ring 69 is pressed on the body portion 41 of the cylindrical shell 39, and has a spherical outer surface spaced but a short distance from the spherical inner surface of the shield 58. This ring prevents stones thrown up from the road from being lodged between the shell 39 and the shield 58 when the angularity between the parts of the joint uncovers part of the shell.

It will be understood that the invention is not to be limited to the exact construction shown and described, but that various changes and modifications may be made without departing from the spirit and scope of the invention, as defined in the appended claims.

What is claimed is:

1. In a constant velocity universal joint forming a driving connection between a driving member and a driven member, an annular frame supported upon one of said members, an outer race carried by said annular frame and having a cylindrical peripheral surface formed with an annular groove therein, an inner race supported upon the other of said members, interconnecting means between said races, a resilient sealing ring seated in said annular groove, a sheet metal support having a cylindrical portion encircling the cylindrical peripheral surface of said outer race and contacting said resilient sealing ring to form a seal between said outer race and said support, inwardly projecting detents formed in the cylindrical portion of said support and engaging corresponding indentations in the outer peripheral surface of the outer race to interlock the support to the outer race and compel rotation therewith as a unit, said support also having a portion formed integrally with said cylindrical portion and projecting outwardly beyond the end of said outer race and formed with a radially inwardly offset annular groove having diverging side walls, the center line of the annular groove cross section being inclined and projecting substantially through the center of the universal joint, a resilient sealing ring seated in said annular groove between the diverging side walls thereof and projecting outwardly from the support so that the exposed peripheral surface of the resilient sealing ring lies substantially on the surface of the sphere whose center coincides with the center of the universal joint, said last mentioned resilient sealing ring having an annular groove formed on its periphery to divide the peripheral surface thereof into a pair of spaced annular ribs, a semispherical sheet metal shield surrounding said support and the sealing ring carried thereby and having an integral hub portion axially slidably mounted upon said other member for movement toward and away from said universal joint, spring means engageable with said hub portion to urge said semispherical shield into sealing engagement with the resilient sealing ring carried by said support, said semispherical shield when engaged with said last mentioned resilient sealing ring under the action of said spring means having its center substantially coinciding with the center of said universal joint.

2. The structure defined by claim 1 which is further characterized in that the free end of the cylindrical portion of said sheet metal support is formed with an integral radially outwardly extending marginal flange terminating adjacent the inner surface of said semispherical shield to provide a slight clearance therebetween, and a ring mounted upon the outer periphery of the cylindrical portion of said support, said ring having a maximum diameter substantially equal to the maximum diameter of the marginal flange of said support and having a spherical outer surface whose center coincides with the center of said universal joint and said semispherical shield to provide a small and uniform clearance spaced between the outer periphery of said ring and the inner surface of said semispherical shield.

References Cited in the file of this patent

UNITED STATES PATENTS

| Number | Name | Date |
|---|---|---|
| 1,051,025 | Spicer | Jan. 21, 1913 |
| 2,033,583 | McCarrell | Mar. 10, 1936 |
| 2,087,817 | Saussard | July 20, 1937 |